126,989

UNITED STATES PATENT OFFICE.

DAVID O. SAYLOR, OF ALLENTOWN, PENNSYLVANIA.

IMPROVEMENT IN THE MANUFACTURE OF HYDRAULIC CEMENTS.

Specification forming part of Letters Patent No. 126,989, dated May 21, 1872.

Specification describing a new and Improved Hydraulic Cement, invented by DAVID O. SAYLOR, of Allentown, in the county of Lehigh and State of Pennsylvania.

This invention relates to a new manner of treating the argillo-magnesian limestone, found along the Appalachian range of mountains, which is used for manufacturing hydraulic cement, containing carbonate of lime, magnesia, alumina, and other chemicals adapted for that purpose. My invention consists in the mixing of raw stone with said material after the latter has been burnt; thereby several of the valuable ingredients lost in the limestone during the burning process are restored to it, and valuable properties of which the raw stone is possessed are added.

The following is a description of the proceeding: The limestone is first burnt and crushed in the ordinary manner employed in the making of Coplay, Rosendale, Allen, and other American cements. About one-fifth of its weight of raw stone, ground to an impalpable powder, is next added to it, and the whole mass ground together to insure proper mixture of the ingredients.

I do not want to be understood as confining myself to any particular quantity to be added, or to any particular mode of adding it, but simply the use of raw stone in connection with the burnt material.

Having thus described my invention, I claim as new and desire to secure by Letters Patent—

The new hydraulic cement, composed of the ingredients specified.

DAVID O. SAYLOR.

Witnesses:
WM. J. WEISS,
W. THOMAS.